(12) United States Patent
Schepmann

(10) Patent No.: US 10,744,899 B2
(45) Date of Patent: Aug. 18, 2020

(54) BALANCING ENERGY IN A PARALLELIZED BATTERY SYSTEM

(71) Applicant: Proterra Inc., Burlingame, CA (US)

(72) Inventor: Seneca Schepmann, Greenville, SC (US)

(73) Assignee: Proterra Inc., Burlingame, CA (US)

( * ) Notice: Subject to any disclaimer, the term of this patent is extended or adjusted under 35 U.S.C. 154(b) by 0 days.

(21) Appl. No.: 16/169,594

(22) Filed: Oct. 24, 2018

(65) Prior Publication Data

US 2020/0130512 A1 Apr. 30, 2020

(51) Int. Cl.
| | |
|---|---|
| *H01M 10/44* | (2006.01) |
| *B60L 58/22* | (2019.01) |
| *H01M 10/42* | (2006.01) |
| *B60L 58/12* | (2019.01) |
| *B60L 50/60* | (2019.01) |

(52) U.S. Cl.
CPC .............. *B60L 58/22* (2019.02); *B60L 50/66* (2019.02); *B60L 58/12* (2019.02); *H01M 10/425* (2013.01); *H01M 10/441* (2013.01); *B60L 2200/18* (2013.01); *H01M 2010/4271* (2013.01)

(58) Field of Classification Search
USPC ........................................................ 320/126
See application file for complete search history.

(56) References Cited

U.S. PATENT DOCUMENTS

| | | | |
|---|---|---|---|
| 8,453,773 B2 | 6/2013 | Hill et al. | |
| 9,905,893 B2 | 2/2018 | Walker | |
| 2006/0091857 A1* | 5/2006 | Nakanishi | H02J 7/0021 320/116 |
| 2011/0127962 A1* | 6/2011 | Murao | H02J 7/0016 320/118 |
| 2014/0266063 A1* | 9/2014 | Loftus | H02J 7/0016 320/136 |
| 2017/0351561 A1* | 12/2017 | Yamazoe | B60L 58/21 |
| 2018/0118011 A1 | 5/2018 | Grace et al. | |

* cited by examiner

*Primary Examiner* — Bryce M Aisaka
(74) *Attorney, Agent, or Firm* — Bookoff McAndrews, PLLC

(57) ABSTRACT

A method for balancing energy in an energy storage system of an electric vehicle includes detecting a first voltage of a first energy storage unit (ESU) and a second voltage of a second energy storage unit of the energy storage system, and determining a discharge time corresponding to the detected second voltage. The method may also include discharging energy from the first energy storage unit, while not discharging energy from the second energy storage unit, for a duration of the determined discharge time.

19 Claims, 5 Drawing Sheets

BALANCING ENERGY IN A PARALLELIZED BATTERY SYSTEM

TECHNICAL FIELD

Embodiments of this disclosure relate to systems and methods for energy balance in battery systems.

BACKGROUND

An energy storage system, or a battery system, typically includes a plurality of batteries or other energy storage devices coupled together to provide electric power for an application. The total energy of the system may be scaled up or down by increasing or decreasing the number of energy storage devices of the system. Energy storage systems, can be used in many applications. For example, an energy storage system having many batteries connected together may be used to provide power to buildings, machines, etc. In another example, an energy storage system may be used to power an electric vehicle. When the stored energy in the energy storage system decreases, the system may be recharged, for example, by using power from a utility grid and/or an internal combustion engine.

In energy storage systems where a plurality of batteries (or energy storage subunits) are coupled together, the amount of energy stored in the different batteries of the system may be, or become, different over time. That is, energy may be unevenly balanced between the different energy storage units of an energy storage system. Such an imbalance of stored energy can affect the efficiency, reliability, and output of the energy storage system. Embodiments of the current disclosure may address these and/or other problems in the art. The scope of the current disclosure, however, is defined by the attached claims, and not by the ability to solve any specific problem.

SUMMARY

Embodiments of the present disclosure relate to, among others, systems and methods for balancing energy between the different energy storage subunits of an energy storage system. Each of the embodiments disclosed herein may include one or more of the features described in connection with any of the other disclosed embodiments.

In one aspect, a method for balancing energy in an energy storage system of an electric vehicle is disclosed. The method may include detecting a first voltage of a first energy storage unit (ESU) and a second voltage of a second energy storage unit of the energy storage system, and determining a discharge time corresponding to the detected second voltage. The method may also include discharging energy from the first energy storage unit, while not discharging energy from the second energy storage unit, for a duration of the determined discharge time.

In another aspect, a method for balancing energy in an energy storage system of an electric vehicle is disclosed. The energy storage system includes at least a first, a second, and a third energy storage unit (ESU) configured to be electrically connected in parallel. The method may comprise detecting a first voltage of the first ESU, a second voltage of the second ESU, and a third voltage of the third ESU, wherein when the first voltage is higher than the second voltage and the second voltage is higher than the third voltage. The method may also include determining a second discharge time corresponding to the detected second voltage and a third discharge time corresponding to the third voltage. The method may also include discharging energy from the first ESU, while not discharging energy from the second ESU and the third ESU, for a duration of the determined second discharge time.

In yet another aspect, an electric vehicle is disclosed. The electric vehicle includes an energy storage system including a plurality of energy storage units (ESUs) electrically connected in parallel and one or more traction motors configured to be powered by the energy storage system. The electric vehicle may also include a controller configured to (a) detect a voltage of a first ESU of the plurality of ESUs, (b) determine a discharge time corresponding to the detected voltage, and (c) not discharge energy from the first ESU for a duration of the determined discharge time.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for balancing energy between the different energy storage subunits of an energy storage system. While principles of the current disclosure may be described with reference to the battery system of an electric vehicle, it should be understood that the disclosure is not limited thereto. Rather, the systems of the present disclosure may be used in a energy storage system for any application (e.g., battery of a stationary energy storage device, electric machine, electric tool, electric appliance, etc.). In this disclosure, relative terms, such as "about," "substantially," or "approximately" are used to indicate a possible variation of ±10% of a stated value. Any implementation described herein as exemplary is not to be construed as preferred or advantageous over other implementations. Rather, the term "exemplary" is used in the sense of example or illustrative. Further all ranges are understood to be inclusive of their endpoints. For example, the range of from 1 centimeter (cm) to 5 cm includes values of 1 cm, 5 cm, and all values in-between.

Figure 1A:
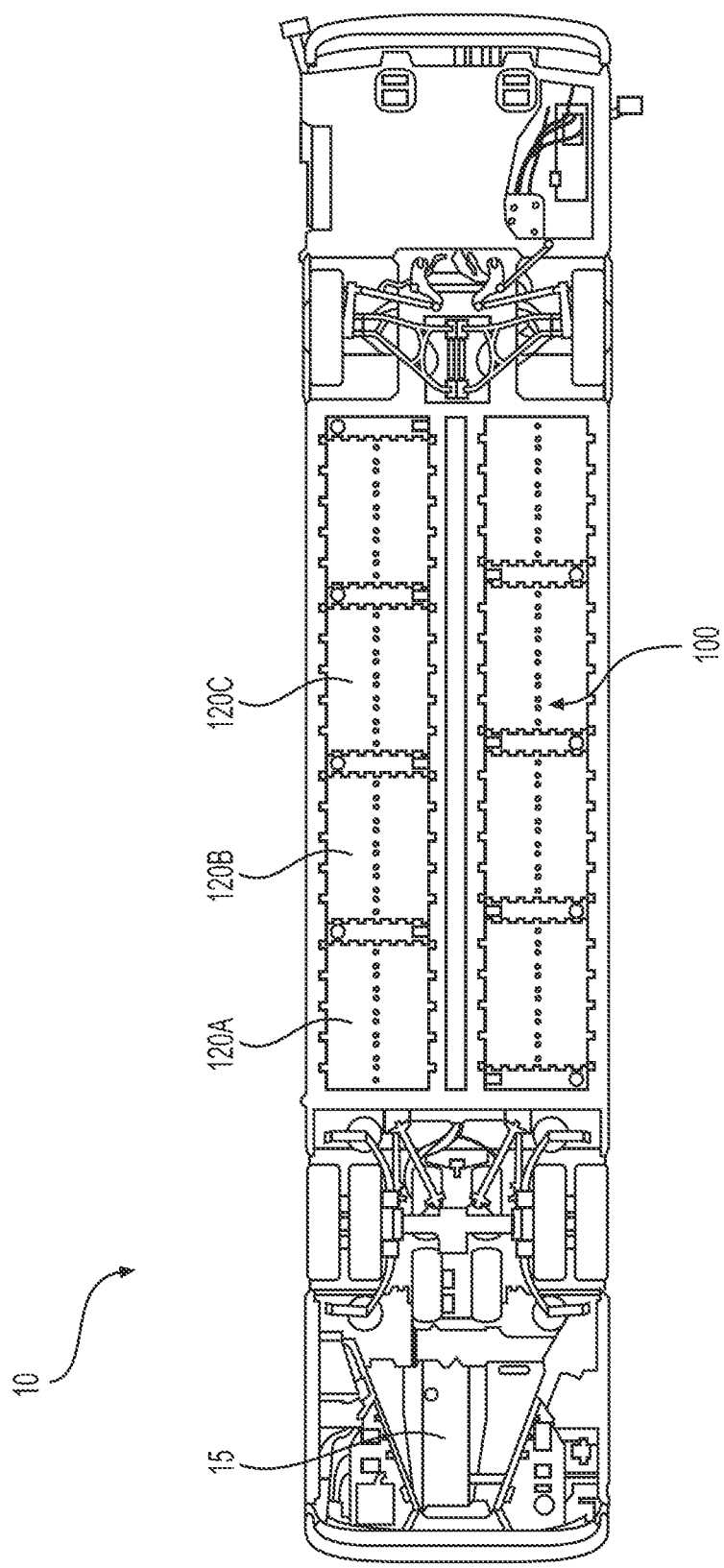
FIG. 1A is a schematic illustration of an energy storage system of an electric vehicle.

FIG. 1A illustrates the underside of an electric vehicle, such as an electric bus 10. Bus 10 may be any type of bus (transit bus, long distance bus, low-floor bus, high-floor bus, etc.) and may include one or electric traction motors 15 that generate power for propulsion. An energy storage system (ESS) 100, or battery system, supplies electric power to traction motor(s) 15 and other accessories (HVAC, lights, etc.) of the bus 10. In some embodiments, ESS 100 may have a modular structure and include multiple battery packs or energy storage units (ESUs) 120A, 120B, 120C, etc. (collectively referred to herein as ESU 120) electrically connected together by some means. ESUs 120 may, in general, be positioned anywhere on bus 10 (inside the bus, on the roof, etc.). In some embodiments, the different ESUs 120 may be positioned at different locations of bus 10 (e.g., some ESUs 120 on the roof, some ESUs inside the bus, some ESUs under the floor, etc.). In some embodiments, as illustrated in FIG. 1A, ESUs 120 may be positioned under the floor of bus 10. As ESUs 120 may have considerable weight, placing them under the floor may assist in keeping the center of gravity of bus 10 lower and balance weight distribution, thus increasing drivability and safety.

Each ESU 120 may have a modular structure and may be comprised of several subunits (battery modules, battery cells, etc.) comprising energy storage cells. For example, in an exemplary application, ESS 100 may comprise a plurality of ESU's (e.g., 4-12 battery packs), and each ESU may comprise a plurality of battery modules (e.g., 6-10 battery modules), and each battery module may comprise a plurality of battery cells (e.g., 5-200 cells). The ESUs 120 and the subunits within each ESU 120 may be electrically connected together in any manner. In an exemplary application, the different ESUs 120 of ESS 100 may be connected together in parallel, and the multiple battery modules of each ESU 120 may also be connected together in parallel. Configuring ESS 100 as multiple parallel-connected strings of ESUs 120 allows bus 10 to continue operating with one or more strings disconnected if an ESU 120 experiences a problem. For example, if ESU 120A experiences a problem, bus 10 may continue to operate with ESU 120A disconnected from ESS 100. However, such an arrangement is only exemplary and other arrangements are considered and contemplated. U.S. application Ser. No. 15/955,052, filed on Apr. 17, 2018 (titled "Overcurrent Protection for Battery Systems), U.S. Publication No. 2018/0118011, and U.S. Pat. No. 9,905,893, incorporated by reference herein in their entireties, disclose exemplary battery systems comprising ESUs with subunits.

In some embodiments, each ESU 120 of an ESS 100 forms a string. Each string may include multiple energy storage cells connected together (e.g., in parallel or in series). In general, the plurality of modules in each ESU 120, and the plurality of battery cells in each module, may be electrically connected together in series or parallel. Although not a requirement, in some embodiments, each ESU 120 of the ESS 100 may be approximately identical (in terms of number of modules, number of strings, number of cells, how the modules are connected, cell chemistry, etc.) to each other. In some embodiments, an ESS 100 may include 2-10 ESUs 120 (e.g., battery packs), each ESU may include 10-20 battery subunits (battery modules), and each battery subunit may include 400-700 energy storage cells. Each energy storage cell may have any suitable chemistry and configuration (e.g., cylindrical cell, prismatic cell, pouch cell, button cell, or other suitable configuration). In some embodiments, the energy storage cells may have a lithium-ion chemistry (e.g., lithium-nickel-cobalt-aluminum, lithium-manganese-spinel, lithium titanate, lithium-iron phosphate, lithium cobalt oxide, etc.). Exemplary battery chemistries are described in commonly assigned U.S. Pat. No. 8,453,773, which is incorporated herein by reference in its entirety.

Figure 1B:
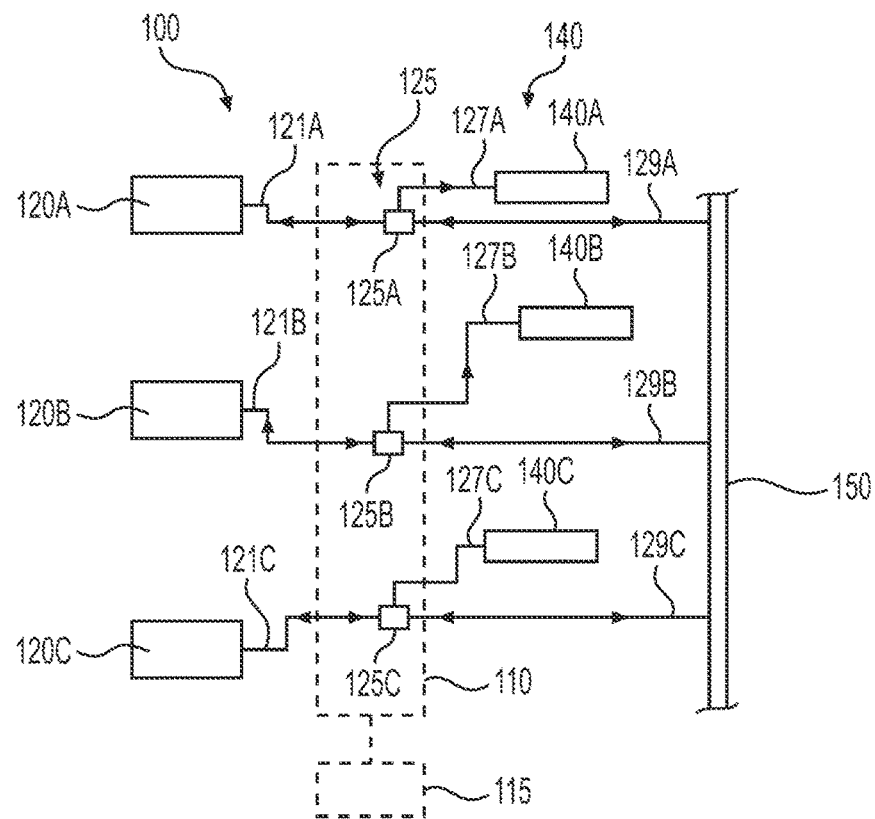
FIG. 1B is a schematic illustration of an exemplary energy storage system of FIG. 1A.

FIG. 1B is a schematic illustration of an exemplary simplified electrical circuit of ESS 100. Although FIG. 1B shows an ESS 100 having three ESUs 120A, 120B, and 120C, this is only exemplary. In general, ESS 100 may have any number of ESUs 120 arranged in any physical configuration. Each ESU 120 may have a protective housing that encloses the one or more subunits (e.g., battery modules) of the ESU 120. In some embodiments, each subunit may also have a protective housing that encloses the multiple battery cells of the subunit therein. ESS 100 of FIG. 1B includes ESUs 120A, 120B, and 120C connected to a common power bus 150. Each ESU 120A, 120B, 120C may also be coupled to a discharge load 140A, 140B, 140C via a load switch or circuit 125A, 125B, 125C. Although not shown in FIG. 1B, ESS 100 may also include circuit protection devices (fuses, relays, contactors, etc.) that are configured to open when the monitored conditions in ESS 100 exceed a threshold value.

Since the coupling of each ESU 120A, 120B, 120C to power bus 150 and to its respective discharge load 140A, 140B, 140C is similar, for the sake of brevity, only the connection of ESU 120A to power bus 150 and discharge load 140A will be described. ESUs 120B and 120C may also be similarly connected to its respective discharge load 140B, 140C, and power bus 150. An electrical bus (hereinafter referred to as busbar) 121A, connects ESU 120A to load switch 125A. And, a busbar 127A connects load switch 125A to discharge load 140A, and busbar 129A connects load switch 125A to power bus 150. Busbars 121A, 127A, 129A may comprise any electrically conductive material (e.g., copper, aluminum, or other metal or metal alloy) having any configuration (e.g., wire, strip, rod, bar, or the like).

Load switch 125A is configured to selectively direct current to power bus 150 or to discharge load 140A. Discharge load 140A is any structure (e.g., resistance) which draws and dissipates electrical energy. Load switch 125A is also configured to allow current to pass from the power bus 150 to ESU 120A, for example, to charge ESU 120A. In some embodiments, load switch 125A may be configured to direct current to both power bus 150 and to discharge load 140A. For the sake of brevity, discharge loads 140A, 140B, 140C will be collectively referred to as discharge load 140, and load switches 125A, 125B, 125C will be collectively referred to as load switch 125. Although, in FIG. 1B, load switch 125A and discharge load 140A are illustrated as being external to ESU 120A, this is only exemplary. In some embodiments, one or both of these components may be positioned within ESU 120A (i.e., within the housing of ESU 120A). The description of load switch 125A and discharge load 140A herein are equally applicable to load switches 125B, 125C, and discharge loads 140B, 140C.

A control unit 110 may be operatively coupled to load switch 125A and 125A configured to switch the load switch between different states. In some embodiments, load switch 125A may have three states: a first state, where current from ESU 120A is directed to only discharge load 140A; a second state, where current from ESU 120A is directed to only the power bus 150 (or current from power bar 150 is directed to ESU 120A); and a third state, where current from ESU 120A is directed to both discharge load 140A and to power bus 150. Control unit 110 may include circuit boards, electronic components, sensors, or other controllers that control the operations of ESS 100. Control unit 110 may be dedicated controller or may be part of a larger controller (such as, for example, battery management system or BMS) of ESS 100. In some embodiments, one or more sensors (schematically represented in FIG. 1B as sensor 115), such as, for example, voltage sensors, current sensors, temperature sensors, humidity sensors, etc., may also be operatively coupled to the control unit 110 or to other components of the ESS 100.

Power bus 150 directs energy into ESS 100 during charging, and out of ESS 100 during discharging. When ESUs 120 discharge energy, control unit 110 directs the energy from ESUs 120 to traction motor 15 (and/or accessories of bus 10 requiring power). Control unit 110 is also configured transfer energy from power bus 150 to ESUs 120. For example, power bus 150 may receive power from ESU 120A via bus lead 129A, from ESU 120B via bus lead 129B, and from ESU 120C via bus lead 129C. Power bus 150 may also charge (i.e., direct power to) ESU 120A via bus lead 129A, charge ESU 120B via bus lead 129B, and charge ESU 120C via bus lead 129C. In some embodiments, power bus 150 is capable of receiving power from one ESU 120 (e.g., ESU 120A) and directing power to (e.g., charging) another ESU 120 (e.g., ESU 120B) at the same time.

In some embodiments, one or more sensors (e.g., sensor 115) may be operably coupled to ESS 100. It should be noted that although a single sensor 115 is illustrated as being coupled to control unit 110 in FIG. 1B, this is only representative. In general, any number of sensors may be coupled to ESUs 120A, 120B, 120C, control unit 110, or to other components of ESS 100. Sensor 115 may detect one or more of voltage, temperature, pressure, humidity, or other environmental conditions from the area surrounding ESS 100, from inside an ESU 120, and/or from an external surface of an ESU 120. Sensor 115 may then relay or transmit a signal to control unit 110. As one of skill in the art would understand, the stored charge in an ESU 120 (or state of charge (SOC) of ESU 120) may be determined based on the voltage of the ESU 120. Even if all ESUs of an ESS 100 are substantially identical, in some embodiments, different ESUs of system 100 may have a different voltage because of difference in the characteristics (e.g., age, use condition, etc.) of the different ESUs 120. Control unit 110 may determine charge of each ESU 120 based on its voltage and selectively activate load switch 125 between its different states.

Figure 1C:
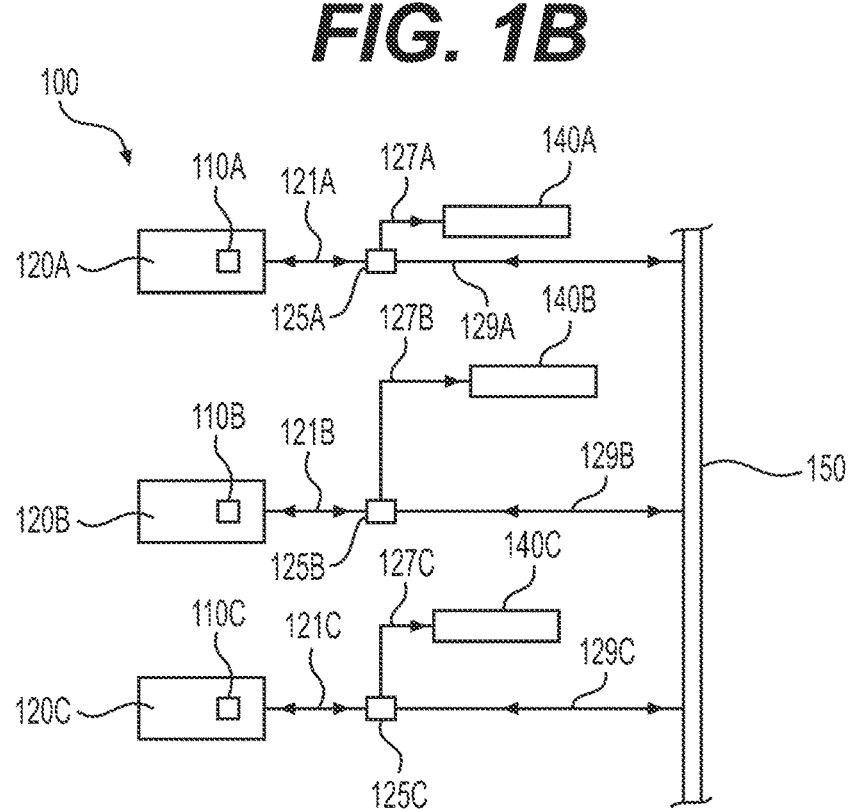
FIG. 1C is a schematic illustration of another exemplary energy storage system of FIG. 1A.

Although control unit 110 is illustrated as being external to ESUs 120 in FIG. 1B, this is only exemplary. In some embodiments, the control unit may be part of the ESU. For example, as illustrated in FIG. 1C, in some embodiments, each ESU 120A, 120B, 120C may include a discrete control unit 110A, 110B, 110C (such as, for example, a battery pack controller) positioned within the housing of the ESU. In such embodiments, control unit 110A only detects the voltage of ESU 120A, control unit 110B only detects the voltage of ESU 120B, and control unit 110C only detects the voltage of ESU 120C. That is, control unit 110A is oblivious of the voltage of ESUs 120B and 120C, etc. And, based on the detected voltage of ESU 120A, control unit 110A selectively activates load switch 125A between its different states.

Control unit 110 may perform one or more methods of balancing energy between the different ESUs 120 of ESS 100. In general, an energy balance method may include controlling energy dissipation of ESS 100 such that the energy stored in each ESU 120 becomes equal or substantially equal over time. For example, with reference to FIGS. 1B and 1C, imagine that at an instant of time, ESU 120A has $E_A$ (kilo Watt hour) kWh of stored charge, ESU 120B has $E_B$ kWh of stored charge, and ESU 120C has $E_C$ kWh of stored charge (where $E_A > E_B > E_C$). In such a scenario, in some embodiments, control unit 110 (or another controller) may control energy dissipation from ESS 100 such that, over a fixed time, ESU 120A dissipates more amount of energy, ESU 120B dissipates less amount of energy, and ESU 120C dissipates the least amount of energy to substantially equalize the energy stored in each ESUs 120A, 120B, and 120C after some time.

Figure 2A:
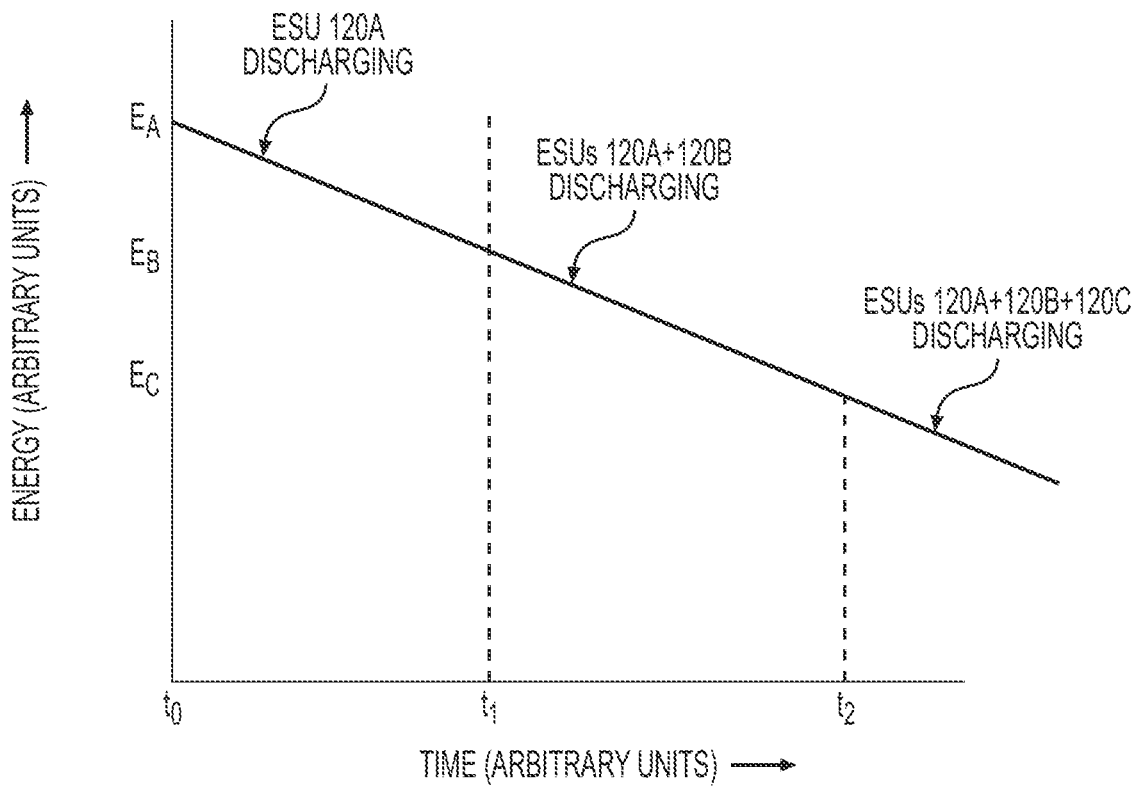
FIG. 2A is a schematic illustration of energy dissipation over time from different energy storage units of the energy storage system of FIG. 1A in an exemplary embodiment.

FIG. 2A schematically illustrates the energy dissipation from ESUs 120A, 120B, and 120C to power bus 150 in one embodiment. As illustrated in FIG. 2A, at time $t_0$, ESU 120A has stored energy of $E_A$ (any arbitrary unit); ESU 120B has stored energy of $E_B$, and ESU 120C has stored energy of $E_C$. Initially (i.e., from time=$t_0$-$t_1$), only ESU 120A dissipates energy to power bus 150. Thereafter (i.e., at time $t_1$), ESU 120B also begins to discharge energy to power bus 150. After a further amount of time (i.e., at time $t_2$), ESU 120C also begins to discharge energy to power bus 150. That is, as illustrated in FIG. 2A, for time period $t_0$-$t_1$, only ESU 120A provides power to power bus 150; for time period of $t_1$-$t_2$, both ESUs 120A and 120B provide power to power bus 150; and for times $\geq t_2$, ESUs 120A, 120B, and 120C provide power to power bus 150. In some embodiments, times $t_1$ and $t_2$ may be selected such that the energy stored in ESUs 120A, 120B, and 120C may become substantially equal over time (e.g., at or after time $t_2$).

It should be noted that the rate of energy discharge (i.e., slope of the curve) of ESUs 120A, 120B, and 120C is indicated as being linear and equal in FIG. 2A only for the sake of simplicity. The rates of energy discharge of ESUs 120A, 120B, and 120C may also be non-linear and/or different. During time period $t_0$-$t_1$, when only ESU 120A provides energy to power bus 150, ESUs 120B and/or 120C may either not discharge energy, or may discharge some amount of energy but dissipate substantially all of the discharged energy in discharge loads 140B, 140C. Similarly, during time period $t_1$-$t_2$, ESU 120C may not discharge energy or may dissipate substantially all of its discharged energy (if any) in discharge load 140C. In some embodiments, during time period $t_0$-$t_1$, when only ESU 120A directs current to power bus 150, a portion of this current may be directed from power bus 150 to one or both of ESUs 120B, 120C to charge these ESUs. Similarly, during time period $t_1$-$t_2$, when both ESUs 120A and 120B direct current to power bus 150, a portion of this current may be directed from the power bus 150 to ESU 120C to charge ESU 120C.

Figure 2B:
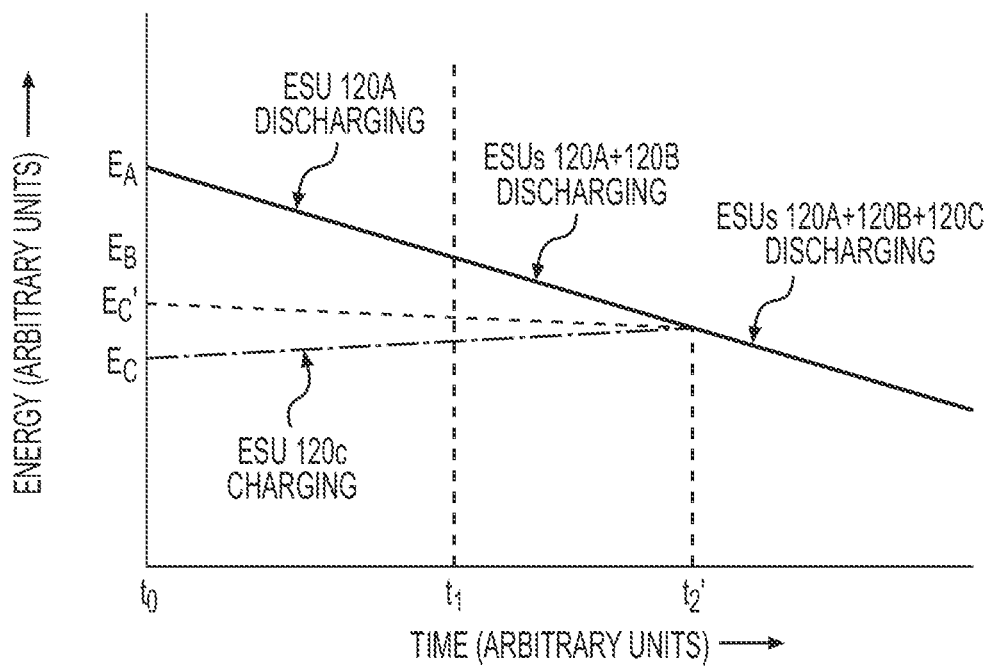
FIG. 2B is a schematic illustration of energy dissipation over time from different energy storage units of the energy storage system of FIG. 1A in another exemplary embodiment.

FIG. 2B is a schematic illustration of energy dissipation from the ESUs 120 to power bus 150 in an embodiment where a portion of the discharged energy is used to charge an ESU. Similar to the scenario described with reference to FIG. 2A, at time $t_0$, ESUs 120A, 120B, and 120C have $E_A$, $E_B$, and $E_C$ stored energy. From $t_0$-$t_1$, only ESU 120A discharges energy to power bus 150. At time $t_1$, ESU 120B also begins to discharge energy to the power bus 150. During this time, a portion of the energy is directed from the power bus 150 to ESU 120C to charge ESU 120C. Since ESU 120C is being charged while ESUs 120A and 120B are being discharged, the energy in ESU 120C increases (from $E_C$ at time $t_0$ to $E_C'$ at time $t_2'$), and the energy in ESUs 120A and 120B decrease during this period. At time $t_2''$, ESU 120C also begins to discharge energy to power bus 150. In some embodiments, as illustrated in FIG. 2B, ESU 120C may begin to dissipate energy to the power bus 150 when the energy in ESUs 120A, 120B, and 120C become substantially equal.

In FIGS. 2A and 2B, the time $t_1$ at which ESU 120B begins to discharge energy to power bus 150 is the time at which ESU 120A has discharged enough energy to the power bus 150 so that the stored energy in ESUs 120A and 120B are substantially equal. Similarly, times $t_2$ (in FIG. 2A) and $t_2''$ (in FIG. 2B) are the times at which the stored energy in ESUs 120A, 120B, and 120C become substantially equal. However, this is not a requirement. In general, times $t_1$ (when ESU 120B begins to discharge energy to power bus 150), $t_2''$ and $t_2$ (when ESU 120C begins to discharge energy to power bus 150) (referred to herein as discharge time values) may be chosen in any manner. In some embodiments, these discharge time values may be chosen based on an ordered association of variables that correlates voltage of an ESU to a discharge time value (e.g., an equation, function, graph, look-up table, etc. —generally referred to herein as map). For example, based on the detected voltage of ESUs 120A, 120B, and 120C, control unit 110 may determine a corresponding discharge time value based on a map that correlates voltages to discharge time values.

Figure 3A:
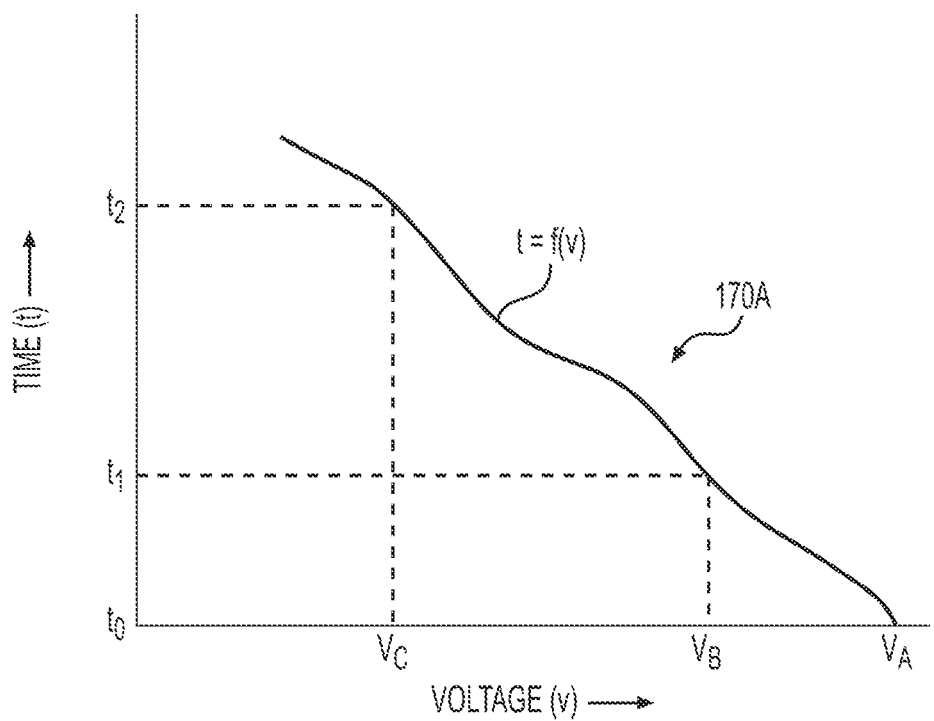
FIG. 3A is a schematic illustration of an exemplary map used to determine discharge time in energy storage system of FIG. 1A in an exemplary embodiment.

FIG. 3A is an exemplary map 170A in the form of a graph that correlates the voltage (V) of an ESU to discharge time (t). The x-axis in FIG. 3A indicates the detected voltage of the ESUs 120 by control unit 110, and the y-axis indicates discharge time (t). The map of FIG. 3A may be determined in any manner. In some embodiments, map 170A may be determined based on experiments, equations (e.g., an equation that represents t as a function of V), etc. In some embodiments, the discharge times corresponding to the voltages of different ESUs 120 (e.g., ESU 120A, 120B, 120C) of ESS 100 may be determined based on map 170A, and the ESS 100 operated as described with reference to FIG. 2A. For example, the discharge time value corresponding to the ESU 120 with the highest voltage ($V_A$ of ESU 120A) may be set as $t_0$, and the discharge time value corresponding to the voltages $V_B$ and $V_C$ of ESUs 120B and 120C, respectively, may be determined as $t_1$, and $t_2$, respectively. And, as described with reference to FIG. 2B, ESS 100 may be operated such that ESU 120B begins to discharge energy to power bus 150 only at time $t_1$ and ESU 120C begins to discharge energy to power bus 150 only at time $t_2$.

Figure 3B:
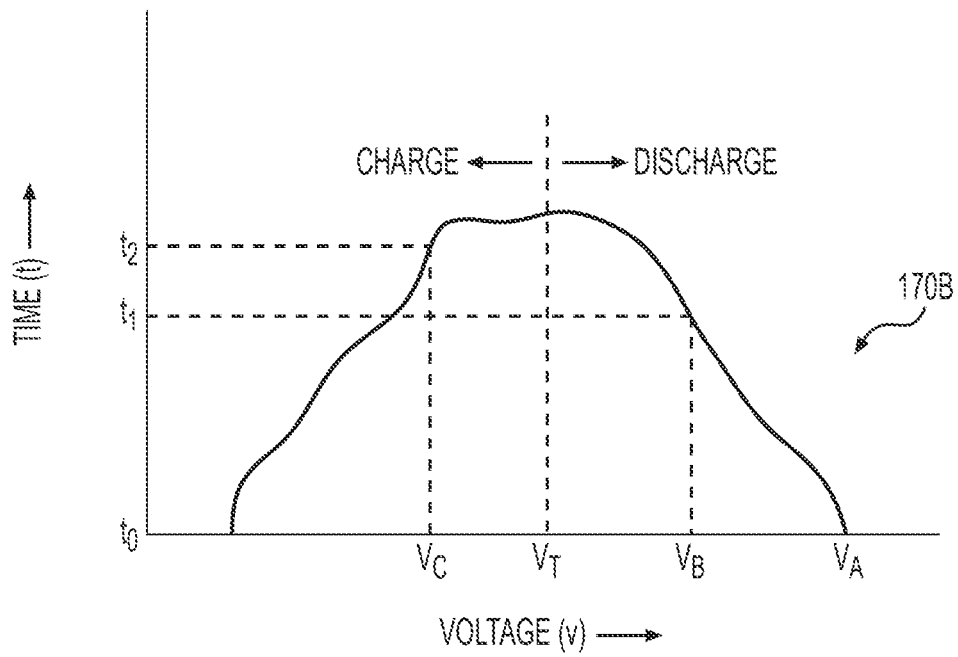
FIG. 3B is a schematic illustration of an exemplary map used to determine discharge time in energy storage system of FIG. 1A in another exemplary embodiment.

FIG. 3B is an exemplary map 170B that may be used in embodiments where some ESUs are charged when other ESUs are discharged. As described with reference to FIG. 3A, the discharge times $t_0$, $t_1$, and $t_2$ corresponding to voltages $V_A$, $V_B$, and $V_C$ of ESUs 120A, 120B, and 120C may first be determined and ESS 100 operated such that the different ESUs discharge energy to power bus 150 at different times. And, ESUs having a voltage value below a predetermined value $V_T$ (such as ESU 120C) may be charged while other ESUs are discharged as described above with reference to FIG. 2B.

Figure 4:
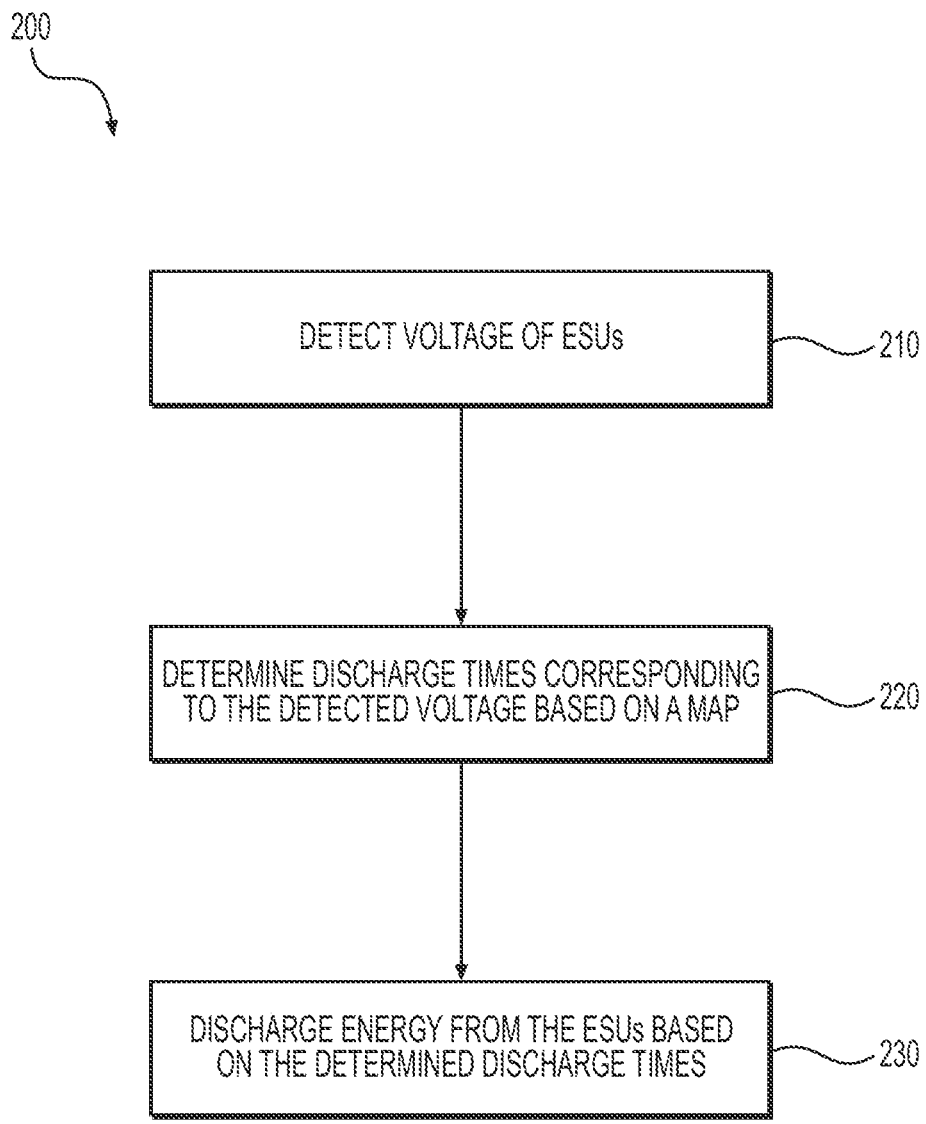
FIG. 4 is a flow chart of an exemplary method of performing energy balance of the energy storage system of FIG. 1A.

An exemplary method 200 of energy balance of ESS 100 is illustrated in FIG. 4. Method 200 may include detecting the voltage of the ESUs (e.g., ESUs 120A, 120B, 120C) of ESS 100 (step 210). For example, the voltage of ESUs 120A, 120B, and 120C may be determined as $V_A$, $V_B$, and $V_C$, where $V_A > V_B > V_C$. In some embodiments, in step 210, a single control unit (e.g., control unit 110 of FIG. 1B) may detect the voltage of all the ESUs 120 of ESS. While in other embodiments, a discrete control unit (e.g., control units 110A, 110B, 110C) associated with different ESU may detect the voltage of that ESU. That is, with reference to FIG. 1C, controller 110A detects the voltage (and hence the SOC) of ESU 120A, controller 110B detects the voltage of ESU 120B, and controller 110C detects the voltage of ESU 120C. Discharge times ($t_1$, $t_2$, etc.) corresponding to the detected voltages may then be determined based on a map (step 220). Energy may then be discharged from the different ESUs based on the determined times (step 230). For example, as described with reference to FIGS. 2A and 2B, energy may be discharged to the power bus 150 from some ESUs (e.g., ESU 120A) for the determined times (e.g., $t_1$) while not discharging energy from other ESUs (e.g., ESU 120B, 120C). In some embodiments, during step 230, some of the power from power bus 150 may also be directed to (some or all of) the ESUs that are not discharging energy (during step 230) to charge these ESU(s) during this time.

By selectively discharging energy from different ESUs of an ESS, the stored energy in different ESUs may be equalized of balanced relatively quickly leading to increased efficiency. While the described method of energy balance is applicable to any energy storage system that includes multiple energy storage units used in any application, the described method is especially useful for parallelized energy storage systems of electric vehicles (e.g., heavy-duty electric vehicles) where multiple energy storage units are connected in parallel to a common power bus. In embodiments where the individual ESUs are positioned closed to each other (as in FIG. 1A), the method is easier to implement since communications between the ESUs is easier. However, even in embodiments where the different ESUs are positioned far from each other (e.g., some ESUs on the roof of a vehicle and some under the floor), the disclosed method may be implemented by, for example, integrating a controller with the ESU (e.g., as described with reference to FIG. 1C).

While principles of the present disclosure are described herein with reference to an energy storage system of an electric bus, it should be understood that the disclosure is not limited thereto. Rather, the systems and methods described herein may be employed for charge distribution in an energy storage system of any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. A method for balancing energy in an energy storage system of an electric vehicle, the energy storage system including a plurality of energy storage units (ESUs), the method comprising:

detecting a first voltage of a first ESU of the plurality of ESUs, a second voltage of a second ESU of the plurality of ESUs, and a third voltage of a third ESU, wherein when the first voltage is higher than the second voltage and the second voltage is higher than the third voltage:

determining a first discharge time corresponding to the detected second voltage;

determining a second discharge time corresponding to the detected third voltage;

discharging energy from the first ESU, while not discharging energy from the second ESU, for a duration of the determined first discharge time; and discharging energy from the first ESU, while not discharging energy from the third ESU, for a duration of the determined second discharge time.

2. The method of claim 1, further including directing energy from a power bus to the second ESU for the duration of the determined first discharge time.

3. The method of claim 1, wherein discharging energy from the first ESU includes simultaneously directing energy to the second ESU and/or the third ESU.

4. The method of claim 1, wherein the plurality of ESUs are connected in parallel to a power bus.

5. The method of claim 1, further including discharging energy from the third ESU after the duration of the determined second discharge time.

6. The method of claim 1, further including discharging energy from the second ESU after the duration of the determined first discharge time.

7. The method of claim 1, wherein determining the first discharge time and the second discharge time includes determining the first and second discharge times from a map that correlates different voltages to different discharge times.

8. The method of claim 1, wherein the electric vehicle is an electric bus.

9. The method of claim 1, wherein a first controller is configured to detect the first voltage of the first ESU and discharge energy from the first ESU, a second controller is configured to detect the second voltage of the second ESU and not discharge energy from the second ESU for the duration of the determined first discharge time, and a third controller is configured to determine the third voltage and not discharge energy from the third ESU for the duration of the determined second discharge time.

10. A method for balancing energy in an energy storage system of an electric vehicle, the energy storage system including at least a first, a second, and a third energy storage unit (ESU) configured to be electrically connected in parallel, the method comprising:
   detecting a first voltage of the first ESU, a second voltage of the second ESU, and a third voltage of the third ESU, wherein when the first voltage is higher than the second voltage and the second voltage is higher than the third voltage:
   determining a second discharge time corresponding to the detected second voltage and a third discharge time corresponding to the third voltage;
   discharging energy from the first ESU, while not discharging energy from the second ESU, for a duration of the determined second discharge time and
   discharging enery from the first ESU, while not discharging energy from the third ESU, for a duration of the determined third discharge time.

11. The method of claim 10, further including discharging energy from the second ESU, while not discharging energy from the third ESU, after the duration of the determined second discharge time.

12. The method of claim 10, further including discharging energy from the third ESU after the duration of the determined third discharge time.

13. The method of claim 10, wherein discharging energy from the first ESU includes directing energy to the second ESU and/or the third ESU.

14. The method of claim 10, wherein determining the second discharge time and the third discharge time includes determining the second and third discharge times from a map that correlates different voltages to different discharge times.

15. The method of claim 10, wherein the electric vehicle is a heavy duty electric vehicle.

16. The method of claim 10, wherein a first controller is configured to detect the first voltage of the first ESU and discharge energy from the first ESU, a second controller is configured to detect the second voltage of the second ESU and not discharge energy from the second ESU for the duration of the determined second discharge time, and a third controller is configured to determine the third voltage and not discharge energy from the third ESU for the duration of the determined third discharge time.

17. An electric vehicle, including:
   an energy storage system including a plurality of energy storage units (ESUs) electrically connected in parallel;
   one or more traction motors configured to be powered by the energy storage system;
   a first controller configured to (a) detect a voltage of a first ESU of the plurality of ESUs, (b) determine a discharge time corresponding to the detected voltage, and (c) not discharge energy from the first ESU for a duration of the determined discharge time; and
   a second controller configured to (a) detect a second voltage of a second ESU of the plurality of ESUs, (b) determine a second discharge time corresponding to the detected second voltage, and (c) not discharge energy from the second ESU for a duration of the determined second discharge time.

18. The electric vehicle of claim 17, wherein the first controller and the second controller are the same or part of a single control system.

19. The electric vehicle of claim 17, wherein the first controller is different from, and not operably connected to, the second controller.

* * * * *